United States Patent [19]

Bauerle

[11] Patent Number: 4,989,632

[45] Date of Patent: Feb. 5, 1991

[54] APPARATUS FOR USE IN AN AUTOMATED LIQUID COMBINATION AND TRANSPORT SYSTEM

[75] Inventor: William L. Bauerle, Wooster, Ohio

[73] Assignee: Bahm, Inc., St. Louis, Mo.

[21] Appl. No.: 437,462

[22] Filed: Nov. 15, 1989

[51] Int. Cl.$^{5}$ .............................................. G05D 11/13

[52] U.S. Cl. .................................... 137/343; 137/376; 137/599.1; 137/606

[58] Field of Search ................. 137/343, 356, 606, 88, 137/376, 599.1

[56] References Cited

U.S. PATENT DOCUMENTS

| | | | |
|---|---|---|---|
| 2,002,279 | 5/1935 | Schmidt | 137/376 X |
| 2,109,331 | 2/1938 | Cornell | 137/164 |
| 2,758,878 | 8/1956 | Dominick | 137/606 X |
| 3,460,566 | 8/1969 | Heartstedt et al. | 137/599.1 X |
| 3,702,619 | 11/1972 | Son | 137/88 X |
| 3,739,794 | 6/1973 | Lindgren | 137/599.1 X |

OTHER PUBLICATIONS

B-E De Lier B.V., "Substrate Technology for the Nineties", both sides.

H. E. Anderson Co., "Ratio:Feeder ®", 10/83.

H. E. Anderson Co., "Ratio:Feeder Fertilizer Injector", 12/78.

Climate Control Systems, Inc., "The Harrow Fertigation Manager", Greenhouse Canada, 8/89, p. 29.

H. E. Anderson Co., "Ratio:Feeder ®".

H. E. Anderson Co., "Series S Ratio:Feeder", 12/78.

H. E. Anderson Co., "Automatic Medicator".

H. E. Anderson Co., Photograph No. 1.

H. E. Anderson Co., Photograph No. 2.

*Primary Examiner*—Stephen M. Hepperle

*Attorney, Agent, or Firm*—Senniger, Powers, Leavitt & Roedel

[57] ABSTRACT

Apparatus for use in an automated liquid combination and transport system including one or more injectors for injecting liquid additives from various reservoirs into a primary liquid, including a frame having a front, a back and opposing sides. The frame has support columns for supporting the injectors on it. A tank connected to the frame is connected to a tubular input manifold mounted on the frame for carrying the primary liquid and liquid additives into the tank. The input manifold has a plurality of inlets spaced axially of the manifold which may be connected to the injectors which inject liquid additives from the reservoirs into the input manifold through its inlets. The input manifold extends generally side-to-side of the frame and is disposed with its inlets facing generally forwardly with respect to the frame so that its inlets are accessible from the front of the frame. A tubular output manifold is mounted on the frame and connected to the tank for transporting a primary liquid and liquid additive mixture from the tank.

19 Claims, 2 Drawing Sheets

APPARATUS FOR USE IN AN AUTOMATED LIQUID COMBINATION AND TRANSPORT SYSTEM

BACKGROUND OF THE INVENTION

This invention relates generally to automated liquid combination and transport systems and more particularly to apparatus for use in combining liquid additives with a primary liquid as part of such a system.

Automated liquid combination and transport systems are particularly advantageous in applications involving large scale or continuous combining of liquids. Precise control and accurate repetition of the mixing proportions can be achieved with such a system. Further, the system can continuously monitor the product liquid mixture and automatically readjust the proportions of the various liquids injected into the product mixture. An injector of the general type described for injecting liquids is disclosed in co-assigned, co-pending application Ser. No. 07/266,885 filed Nov. 3, 1988. A system of the type generally described for controlled feeding of plants is disclosed in co-assigned co-pending application Ser. No. 07/302,765 filed Jan. 25, 1989. Application Ser. Nos. 07/266,885 and 07/302,765, relating to injectors and systems of the type to which the present invention is particularly applicable, are hereby incorporated by reference in the present application.

Liquid combination and transport systems of the type generally described include injectors which inject a liquid additive into a primary liquid carried by a conduit, which is part of the combining apparatus, through ports in the conduit. The injectors require monitoring and calibration to ensure that the desired mixing proportions are maintained. Heretofore, the injectors and the conduit have been held on the combining apparatus in such a way that the injectors and the ports in the conduit must be accessed from different sides of the apparatus. Therefore, the apparatus cannot be placed against a wall and requires considerable space so that access to the injector and parts may be had from all sides of the apparatus. Further, present combining apparatus hold the injectors in fixed positions such that configuration for special applications is not possible without detaching the injector from the apparatus.

SUMMARY OF THE INVENTION

Among the several objects of the present invention is the provision of apparatus for use in a liquid combination and transport system in which the components of the apparatus are accessible from one side of the apparatus; the provision of such apparatus which is compact in design and takes up relatively little space in a room; the provision of such apparatus which can be reconfigured according to the operating requirements; the provision of such apparatus which may be easily bypassed in case of failure of a component without shutting down the entire system; the provision of such apparatus which thoroughly mixes the liquid additives prior to distribution; and the provision of such apparatus which is economical to manufacture.

Generally, apparatus constructed according to the principles of the present invention is used in an automated liquid combination and transport system including one or more injectors for injecting liquid additives from various reservoirs into a primary liquid. The apparatus comprises a frame having a front, a back and opposing sides, and includes means for supporting the injectors thereon. A tank connected to the frame is connected to a tubular input manifold mounted on the frame for carrying the primary liquid and liquid additives into the tank. The input manifold has a plurality of inlets in it spaced axially of the input manifold which are adapted for connection to injectors which inject liquid additives from the reservoirs into the input manifold through its inlets. The input manifold extends generally side-to-side of the frame and is disposed with its inlets facing generally forwardly with respect to the frame such that access to all of its inlets may be had from the front of the frame. A tubular output manifold mounted on the frame and connected to the tank transports a primary liquid and liquid additive mixture from the tank.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF A PREFERRED EMBODIMENT

Figure 1:
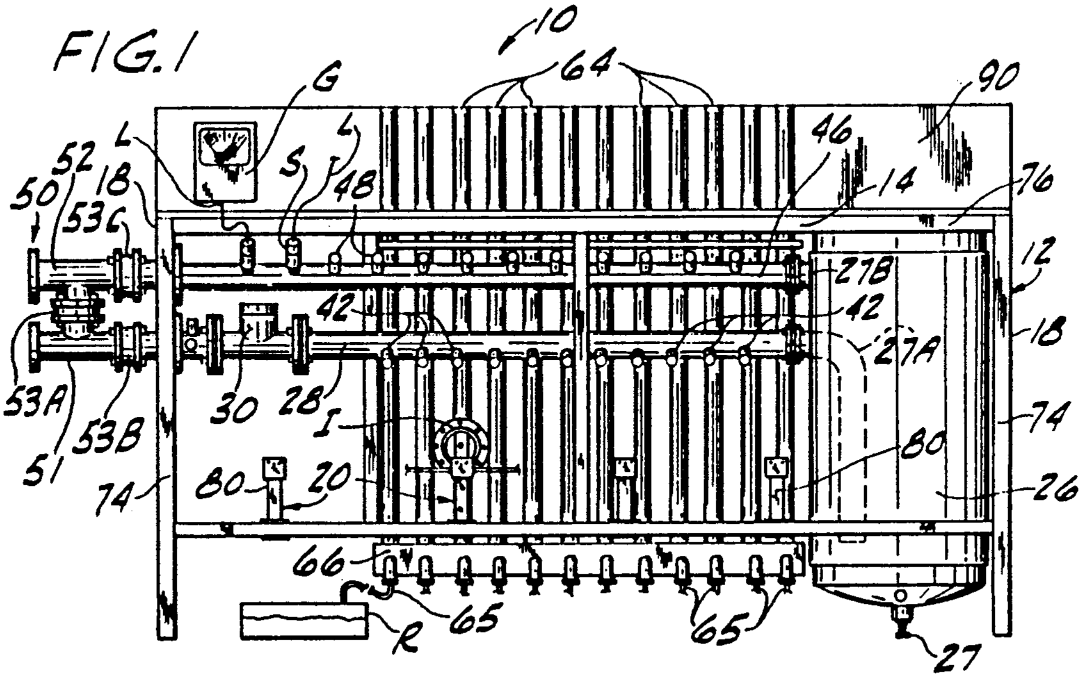
FIG. 1 is a front elevation of apparatus constructed according to the principles of the present invention.
Figure 2:
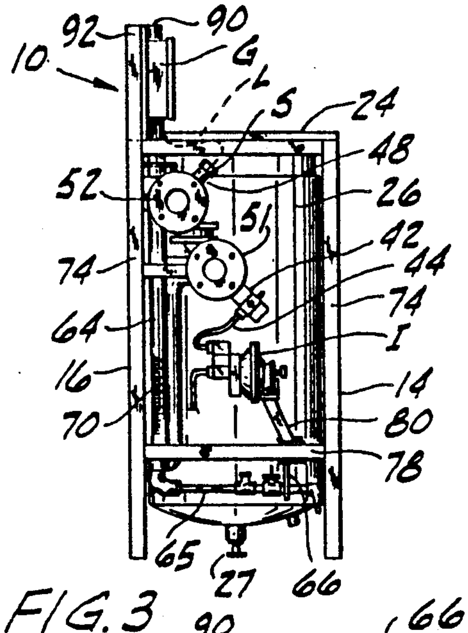
FIG. 2 is a left side elevation of the apparatus.
Figure 3:
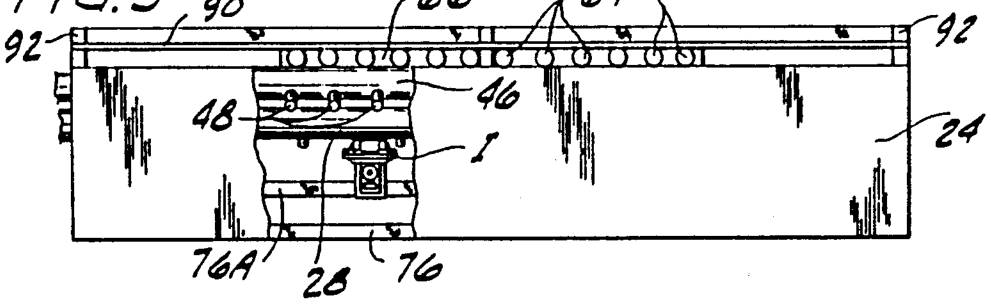
FIG. 3 is a top view of the apparatus with parts broken away to show detail.

Referring now to the drawings, and particularly to FIG. 1, apparatus indicated generally at 10 for use in a liquid combination and transport system is shown. The system described in the following detailed description is the type used for automated irrigation and chemical treatment of plants in a greenhouse and includes one or more injectors for injecting liquid additives from various reservoirs R (only one is shown) into a primary liquid. It is to be understood that the apparatus 10 of the present invention is not limited to use in irrigation and chemical treatment systems. The apparatus includes a frame, generally indicated at 12 having a front 14, a back 16, opposing sides 18 and means 20 for supporting injectors I (only one is shown) on the frame. The frame 12 is has the general shape of a rectangular parallelepiped, and has a greater dimension from side-to-side than from front-to-back. As shown in FIG. 3, the top of the frame is covered by a panel of plywood 24. A generally cylindric tank 26 is attached to the frame 12 adjacent one of the sides 1B of the frame (the right side, as viewed in FIG. 1), and has a foot 27 at its bottom supporting the tank from the floor. The tank 26 has an input tube 27A and an output tube 27B extending outwardly from the side of the tank. The input tube 27A is located generally beneath the output tube 27B, and is releasably connected to an input manifold 28. The input manifold 28 is mounted on the frame 12 and carries the primary liquid (such as water flowing in from the left, as seen in FIG. 1, through flow meter 30) and liquid additives (such as liquid chemical plant nutrients) into the tank. The input tube 27A curves downwardly inside the tank 26 so that the mixture of primary liquid and liquid additive is discharged into the tank near its bottom. In the tank 26, the primary liquid and liquid additives become mixed to achieve uniform concentrations throughout a volume of liquid mixture before transport to the system for distribution to the plants. The input manifold 28 extends in a generally side-to-side direction with respect to the frame 12. A plurality of inlets 42, spaced axially of the input manifold 28, are connected by a conduit 44 to one of the injectors I (FIG. 2). The injector injects liquid chemical plant nutrient from one of the reservoirs R through the inlets 42 into the input manifold 28 and the water (primary liquid) carried therein. The input manifold 28 is disposed so that its inlets 42 face generally forwardly with respect to the frame 12 such that its inlets are accessible from the front 14 of the frame.

A tubular output manifold 46 is mounted on the frame 12 and releasably connected to the output tube 27B of the tank 26 for transporting a mixture of water and liquid chemical plant nutrients from the tank to the system for distribution. The output manifold 46 has a plurality of ports 48 in it spaced axially of the manifold which are adapted for connection to sensors S operable to measure properties reflecting the composition of the mixture. As shown in FIG. 1, lead lines L from the sensors S may lead to a gauge G mounted on the frame 12, or alternatively, as indicated by the broken lead line, to a control room removed from the corrosive atmosphere around the apparatus 10. The sensor S may be connected to a control system (not shown) which automatically varies the amount of the liquid chemical plant nutrients injected into the water according to the sensor signal. The output manifold 46 extends generally side-to-side of the frame 12 with its ports 48 facing generally forwardly with respect to the frame 12. Therefore, all of its ports 48 are accessible from the front 14 of the frame 12, which facilitates testing and replacement of the sensors. The output manifold 46 is connected to the tank 26 generally at its top so that the mixture, which is discharged into the tank at its bottom is thoroughly mixed before flowing into the output manifold.

Figure 4:
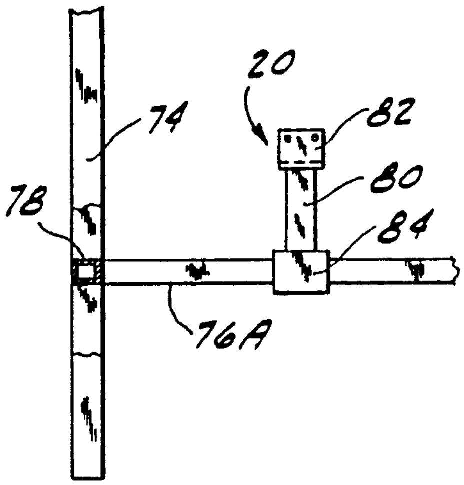
FIG. 4 is a fragment of FIG. 1 showing the first horizontal frame member and a support column.

As may be seen in FIGS. 2 and 4, the input manifold 28 and the output manifold 46 are offset with respect to each other in a front-to-back direction of the frame 12. The liquid chemical plant nutrients used in an irrigation and chemical treatment system are often corrosive and it is possible, considering the number of connections with the output manifold 46, that those liquids could leak from the output manifold onto the input manifold 28 and particularly onto the water meter 30 resulting in damage to the water meter or input manifold. However, because the manifolds are offset, any liquid dripping from the output manifold will miss the input manifold 28 and water meter 30.

The tank 26 may be removed from the frame 12 by simply disconnecting the input manifold 28 and output manifold 46 from the tank and disconnecting the tank from the frame. Thus, the tank may be easily replaced if it becomes damaged (e.g. develops a leak). Further, in some applications the number of liquid additives required may be larger than the number of injectors I which can be held on a single frame 12. In that event, the frame may be "extended" to hold more injectors I by placing two or more frames side-by-side. The tank 26 of one of the frames may be removed and extending pipe (not shown) used to connect the ends of the input and output manifolds to the opposite ends of corresponding input and output manifolds of the other frame.

In the event of a failure in the apparatus 10, such as a leak in the tank 26, means indicated generally at 50 is operable to divert flow of the primary liquid to bypass the tank 26 and the input manifold inlets 42. The bypass means 50 includes a first T-connection 51 connected to the water meter upstream of the input manifold inlets 42. A second T-connection 52 is connected to the output manifold 46 at a position downstream from the ports 48 and is connected to the first T-connection. Three gate valves designated 53A, 53B, 53C, respectively, are operable to divert flow from the input and output manifolds. The gate valves constitute valve means in this embodiment. To divert the flow, the first valve 53A is opened to allow flow between the T-connections 51, 52, the second valve 53B is closed to shut off flow to the input manifold 28 and the third valve is closed to prevent back flow into the output manifold 46.

Figure 5:
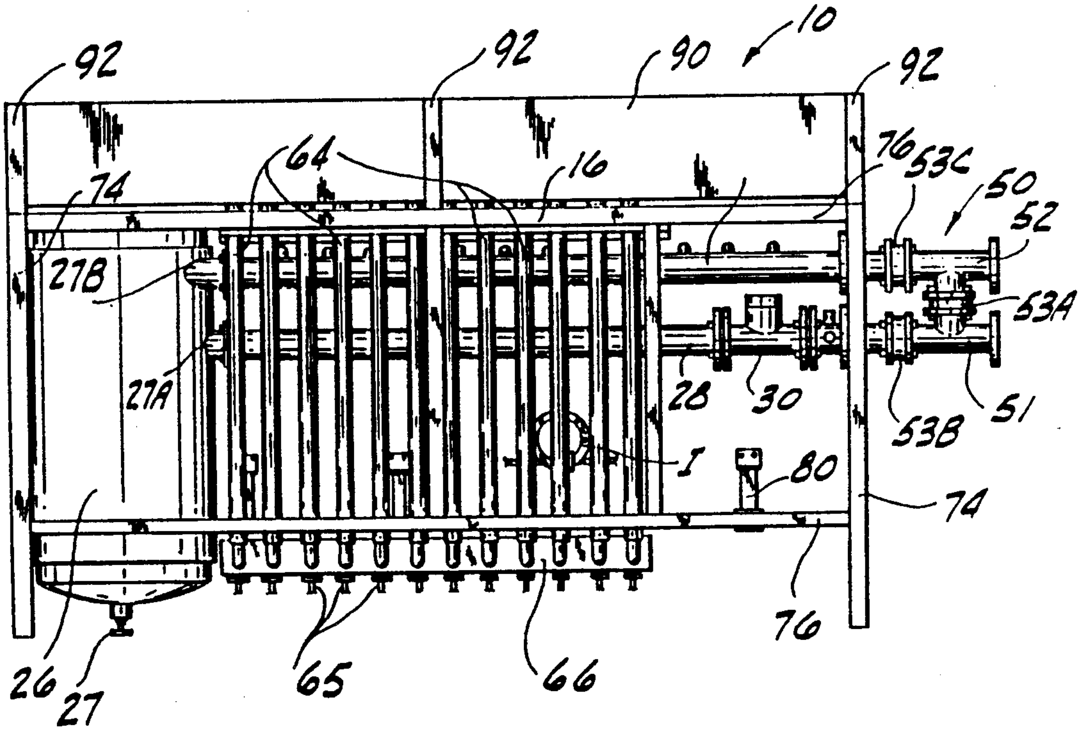
FIG. 5 is a rear elevation of the apparatus.

The frame 12 supports a plurality of gravity tubes 64 which are connected by supply lines 65 to individual reservoirs R of liquid additive. The level of liquid in the tubes 64 corresponds to the level of liquid in the reservoirs R so that the tubes indicate the liquid level in their respective reservoirs. As best seen in FIGS. 1, 3 and 5, two brackets 66 each have a generally planar face with openings therein for receiving gravity tubes 64 to be supported by the bracket. The brackets 66 constitute means for holding a plurality of gravity tubes in this embodiment. The brackets 66 are attached to the frame 12 such as by welding and support the gravity tubes 64 in a generally vertical position at the back 16 of the frame. The tubes 64 are calibrated, having graduated markings 70 on them for indicating the level of fluid in the reservoirs R. The tubes 64 are positioned so that the reservoir levels may be read while standing at the front of the frame 12. Thus it may be seen that all components of the apparatus 10 requiring access and monitoring, such as the gravity tubes 64 and manifold ports 48 and inlets 42, are accessible and may be viewed from the front 14 of the frame 12. Therefore, the frame 12 may be placed in a corner against a wall to save space in the often small quarters in a greenhouse available for the apparatus 10.

The frame 12 includes vertical frame members 74, horizontal frame members 76 extending in a generally side-to-side direction of the frame 12 and transverse frame members 78 extending between the front and back of the frame. As shown in FIG. 4, a first horizontal frame member 76A, which is an elongate bar of rectangular cross section, extends from a lower left transverse frame member 78 in a position between the front 14 and back 16 of the frame 12. The injector supporting means 20 includes a plurality of support columns 80 slidably mounted on the first horizontal frame member 76A for sliding the support columns longitudinally of the first horizontal frame member to position the support column relative to the input manifold inlets 42. The injectors I are mounted on the support columns 80 in an L-shaped seat 82 at the top of each column. At the base of each support column 80 is a sleeve 84 of rectangular cross section adapted to slidingly receive the first horizontal frame member 76A through it. The apparatus 10 may be configured to mount the necessary number of injectors I in desired positions with respect to the input manifold inlets 42 without detaching the injectors from the support columns 80.

The input manifold inlets 42 are cylindric extensions of the manifold projecting generally forwardly and downwardly from the manifold 28 at an angle to the horizontal (FIG. 2). The conduit 44 connecting one of the injectors I to one of the inlets 42 is, in operation, continuously filled with liquid additive. The downward slope of the inlet 42 and the elevation of the input manifold 28 relative to the injector I prevents feeding of liquid additive into the input manifold when the injector is not operating. The prevention of unintentional feed of liquid additive into the input manifold 28 aids in maintaining composition of the liquid mixture produced within precise parameters.

The apparatus has display board means, constituting in this embodiment a panel 90 mounted on a plurality of support members 92 (FIG. 5). The support members are tubular bars having portions (not shown) of reduced cross sectional area which are adapted to be releasably inserted into respective vertical frame members 74 at the back 16 of the frame 12 for removeably attaching the panel 90 to the frame 12. The sensor gauge G may be mounted on the panel 90 for viewing from the front 14 of the frame 12.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for use in an automated liquid combination and transport system including one or more injectors for injecting liquid additives from various reservoirs into a primary liquid, the apparatus comprising, a frame having a front, a back and opposing sides, and including means for supporting the injectors thereon, a tank connected to the frame, a tubular input manifold mounted on the frame and connected to the tank for carrying the primary liquid and liquid additives into the tank, said input manifold having a plurality of inlets therein spaced axially thereof adapted for connection to the injectors which inject liquid additives from the reservoirs into the input manifold through its inlets, the input manifold being disposed with its inlets facing generally forwardly with respect to the frame such that its inlets are accessible from the front of the frame, and a tubular output manifold mounted on the frame and connected to the tank for transporting a primary liquid and liquid additive mixture from the tank, said output manifold having a plurality of ports therein spaced axially thereof, said output manifold extending generally side-to-side of the frame with its ports facing generally forwardly with respect to the frame such that all of its ports are accessible from the front of the frame.

2. Apparatus as set forth in claim 1 wherein the system comprises an irrigation and chemical treatment system and wherein the additives are liquid chemical plant nutrients.

3. Apparatus as set forth in claim 1 wherein said input manifold and said output manifold are releasably connected to the tank.

4. Apparatus as set forth in claim 1 wherein the frame comprises vertical frame members, horizontal frame members extending in a generally side-to-side direction of the frame and transverse frame members extending between the front and back of the frame, and wherein said injector supporting means comprises a plurality of support columns slidably mounted on a first of said horizontal frame members disposed between the front and the back of the frame for sliding the support column longitudinally of said first horizontal frame member to position the column relative to the input manifold.

5. Apparatus as set forth in claim 4 wherein said first horizontal frame member comprises an elongate bar of rectangular cross section and wherein each support column comprises a sleeve of rectangular cross section located at the base of the support column and adapted to slidingly receive said first horizontal frame member therethrough for mounting the support column the frame.

6. Apparatus as set forth in claim 4 wherein the input manifold extends generally side-to-side of the frame and is disposed above the injector support columns, and wherein said input manifold inlets comprise extensions projecting generally forwardly and downwardly from said input manifold at an angle to the horizontal.

7. Apparatus as set forth in claim 1 further comprising a plurality of gravity tubes connected to the reservoirs and wherein the frame has means for holding the gravity tubes thereon.

8. Apparatus as set forth in claim 7 wherein said means for holding a plurality of gravity tubes comprises at least one bracket mounted on the frame having a generally planar face with a plurality openings therein adapted to receive gravity tubes to be supported by the bracket, the brackets holding the gravity tubes in a substantially vertical position on the frame.

9. Apparatus as set forth in claim 1 wherein the tank is generally cylindric and disposed adjacent one of said opposing sides of the frame.

10. Apparatus as set forth in claim 9 wherein said output manifold is attached to the tank generally adjacent the top thereof.

11. Apparatus as set forth in claim 1 wherein the frame has the general shape of a rectangular parallelepiped, and has a greater dimension from side-to-side than from front-to-back.

12. Apparatus as set forth in claim 1 comprising means diverting flow of said primary liquid to bypass the tank and said input manifold inlets.

13. Apparatus as set forth in claim 12 wherein said bypass means comprises a first T-connection connected to said input manifold upstream from said input manifold inlets, a second T-connection connected to said output manifold and to said inlet first T-connection and valve means.

14. Apparatus as set forth in claim 1 wherein said output manifold and said input manifold are offset with respect to each other in a front-to-back direction relative to the frame.

15. Apparatus for use in an automated liquid combination and transport system including one or more injectors for injecting liquid additives from various reservoirs into a primary liquid, the apparatus comprising, a frame having a front, a back and opposing sides, and including means for supporting the injectors thereon, a tank connected to the frame, a tubular input manifold mounted on the frame and connected to the tank for carrying the primary liquid and liquid additives into the tank, said input manifold having a plurality of inlets therein spaced axially thereof adapted for connection to the injectors which inject liquid additives from the reservoirs into the input manifold through its inlets, the input manifold being disposed with its inlets facing generally forwardly with respect to the frame such that its inlets are accessible from the front of the frame, and a tubular output manifold mounted on the frame and connected to the tank for transporting a primary liquid and liquid additive mixture from the tank, the frame comprising vertical frame members, horizontal frame members extending in a generally side-to-side direction of the frame and transverse frame members extending between the front and back of the frame, and wherein said injector supporting means comprises a plurality of support columns slidably mounted on a first of said horizontal frame members disposed between the front and the back of the frame for sliding the support column longitudinally of said first horizontal frame member to position the column relative to the input manifold.

16. Apparatus as set forth in claim 15 comprising a plurality of gravity tubes connected to the reseroirsand adapted to indicate the level of liquid additive in the reservoirs and wherein the frame has means for holding the gravity tube thereon.

17. Apparatus as set forth in claim 16 further comprising meand diverting flow of said primary liquid to bypass the tank and said input manifold inlets.

18. Apparatus for use in an automated liquid combination and transport system including one or more injectors for injecting liquid additives from various reservoirs into a primary liquid, the apparatus comprising, a frame having a front, a back and opposing sides, and including means for supporting the injectors thereon, the frame comprising vertical frame members, horizontal frame members extending in a generally side-to-side direction of the frame and transverse frame members extending between the front and back of the frame, and wherein said injector supporting means comprises a plurality of support columns slidably mounted on a first of said horizontal frame members disposed between the front and the back of the frame for sliding the support column longitudinally of said first horizontal frame member to position the column relative to the input manifold, a tank connected to the frame, a tubular input manifold mounted on the frame and releasably connected to the tank for carrying the primary liquid and liquid additives into the tank, and a tubular output manifold mounted on the frame and releasably connected to the tank for transporting a primary liquid and liquid additive mixture from the tank.

19. Apparatus as set forth in claim 18 wherein said first horizontal frame member comprises an elongate bar of rectangular cross section and wherein each support column comprises a sleeve of rectangular cross section located at the base of the support column and adapted to slidingly receive said first horizontal frame member therethrough for mounting the support column the frame.

* * * * *